Figure 1:
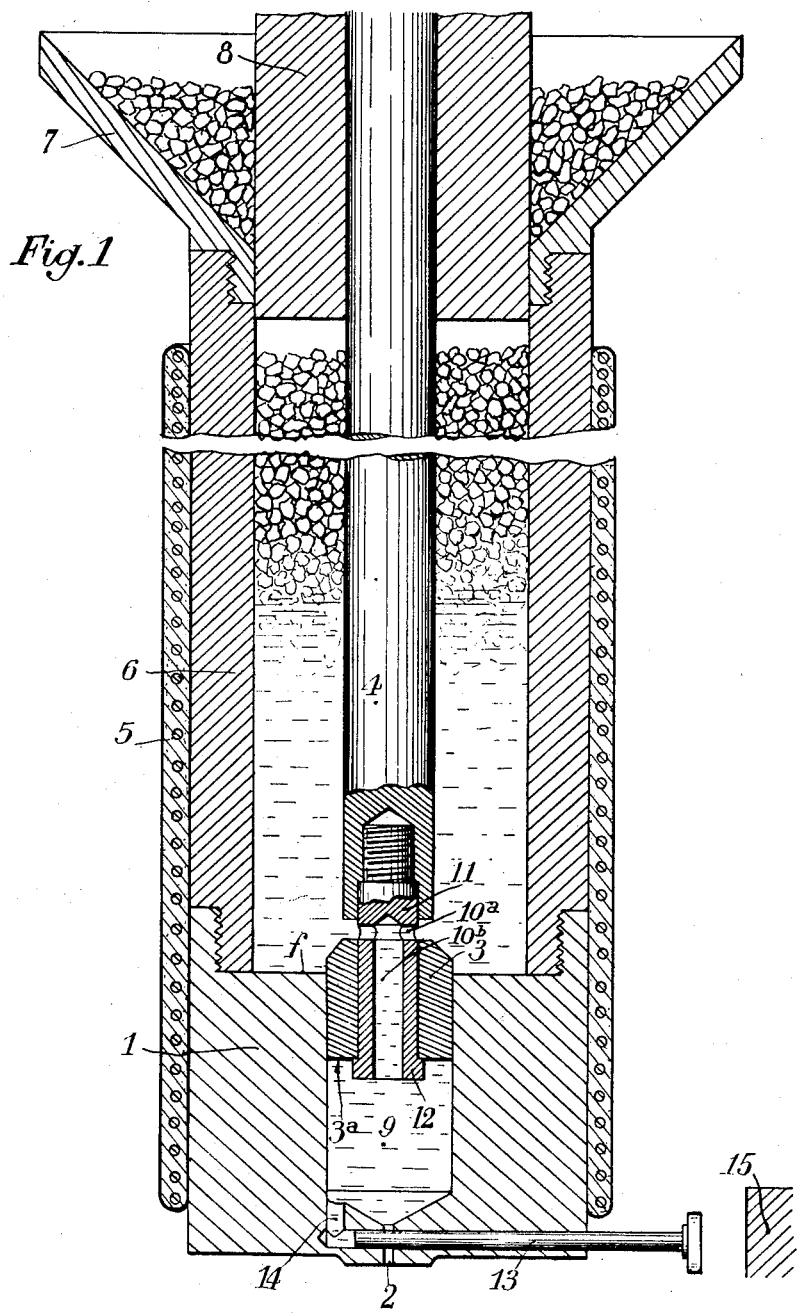

Feb. 10, 1959     M. LABARRE     2,872,705
APPARATUS FOR INJECTION MOULDING OF PLASTIC MATERIAL
Filed Feb. 1, 1954     3 Sheets-Sheet 1

INVENTOR
Maurice Labarre
BY
Curtis, Morris + Safford
ATTORNEYS

Feb. 10, 1959 M. LABARRE 2,872,705
APPARATUS FOR INJECTION MOULDING OF PLASTIC MATERIAL
Filed Feb. 1, 1954 3 Sheets-Sheet 2

INVENTOR
Maurice Labarre
BY
*Curtis, Morris + Safford*
ATTORNEYS

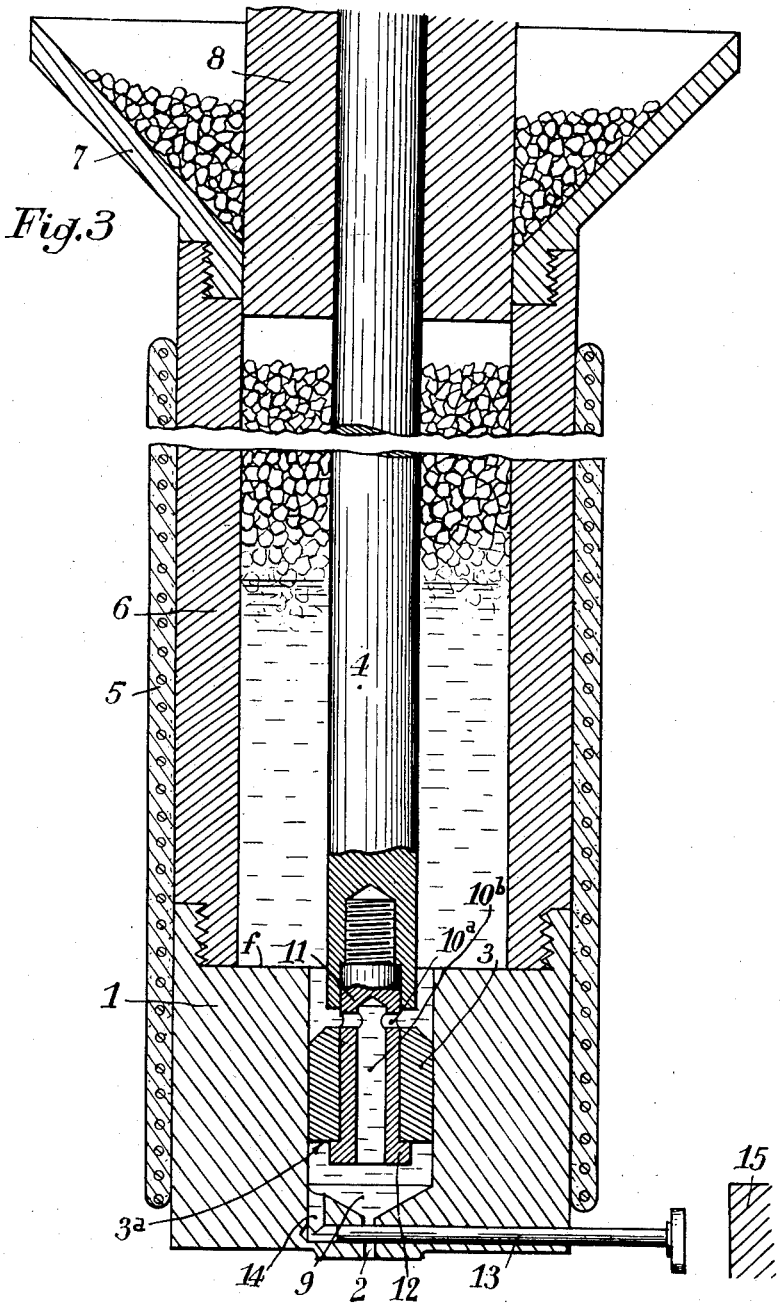

United States Patent Office 2,872,705
Patented Feb. 10, 1959

2,872,705

APPARATUS FOR INJECTION MOULDING OF PLASTIC MATERIAL

Maurice Labarre, Paris, France, assignor to Specialties Alimentaires Bourguignonnes (S. A. B.), Dijon, France, a societe anonyme of France Application February 1, 1954, Serial No. 407,420

Claims priority, application France November 14, 1953

7 Claims. (Cl. 18—30)

A known method of injection of plastic material into a mould consists in forcing the plastic material in the molten state through an orifice formed in the mould, by the pressure of a piston on a mass of powdered or granular raw material contained in a cylinder provided with a heating arrangement which raises the temperature of the raw material from the ambient temperature, at the point of contact with the piston, up to the required temperature in the vicinity of the orifice, in order that the material melted by this increase in temperature may be injected.

As the pressure of the piston is applied to the powder or granular material, the result of this is a considerable loss of pressure from one end of the cylinder to the other, so that, in order to obtain the required injection pressure in the mould, there must be applied to the piston a pressure which is much higher than the pressure which obtains at the injection orifice.

This method does not permit of an exact quantity measurement of the material injected, that is to say it is impossible to inject at a constant pressure and speed the strict quantity of material corresponding to the volume of the mould. In practice, the molten plastic material only begins to flow slowly after a certain compression of the whole of the powdered material has been reached, and thereafter it flows at an increasing speed and increasing pressure.

It will readily be seen that, with this method, the material which passes into the cold mould, that is to say at the ambient temperature, and which has a low initial speed, will tend to set to a certain extent so that in order to continue the injection process, it is necessary to apply considerable pressure to the piston so as to overcome the resistance due to this partial setting and to obtain satisfactory moulding.

These difficulties become more and more pronounced as the thickness of the pieces to be moulded becomes smaller, since in this case their cooling inside the mould is almost instantaneous.

The method which forms the object of the present invention avoids these drawbacks and brings remarkable advantages to injection-moulding.

In its main principles, this method is essentially characterized by the fact that the raw material just reaching the molten state in an injection chamber is injected into the mould by the action of a piston which is submerged in the said molten material, so that the operative face of this piston plunges entirely into a mass which is not granular or powdered, but which possesses such a degree of fluidity that the injection may be carried out very rapidly.

In accordance with a further feature of the invention, means are provided for interrupting, during the period of injection, the communication between the melting chamber and the cylinder in which the injection piston moves, the assembly piston-cylinder constituting a pump supplied with molten plastic material from the said chamber, which forms a melting pit on the top of the injection chamber.

Finally, a further feature of the invention consists in that the raw material, in granular or powdered form, placed in a hopper or the like mounted on the said melting pit, is introduced and forced into this latter by the action of a piston which is quite independent of the injection piston.

There is described below, by way of example and not in any sense by way of limitation, an arrangement for carrying into effect the method according to the invention. In this example, the supply of the body of the pump with molten material is effected through the injection piston itself. This arrangement is shown diagrammatically in longitudinal cross-section in the Figures 1, 2 and 3, at three different stages of its operation.

Figure 2:
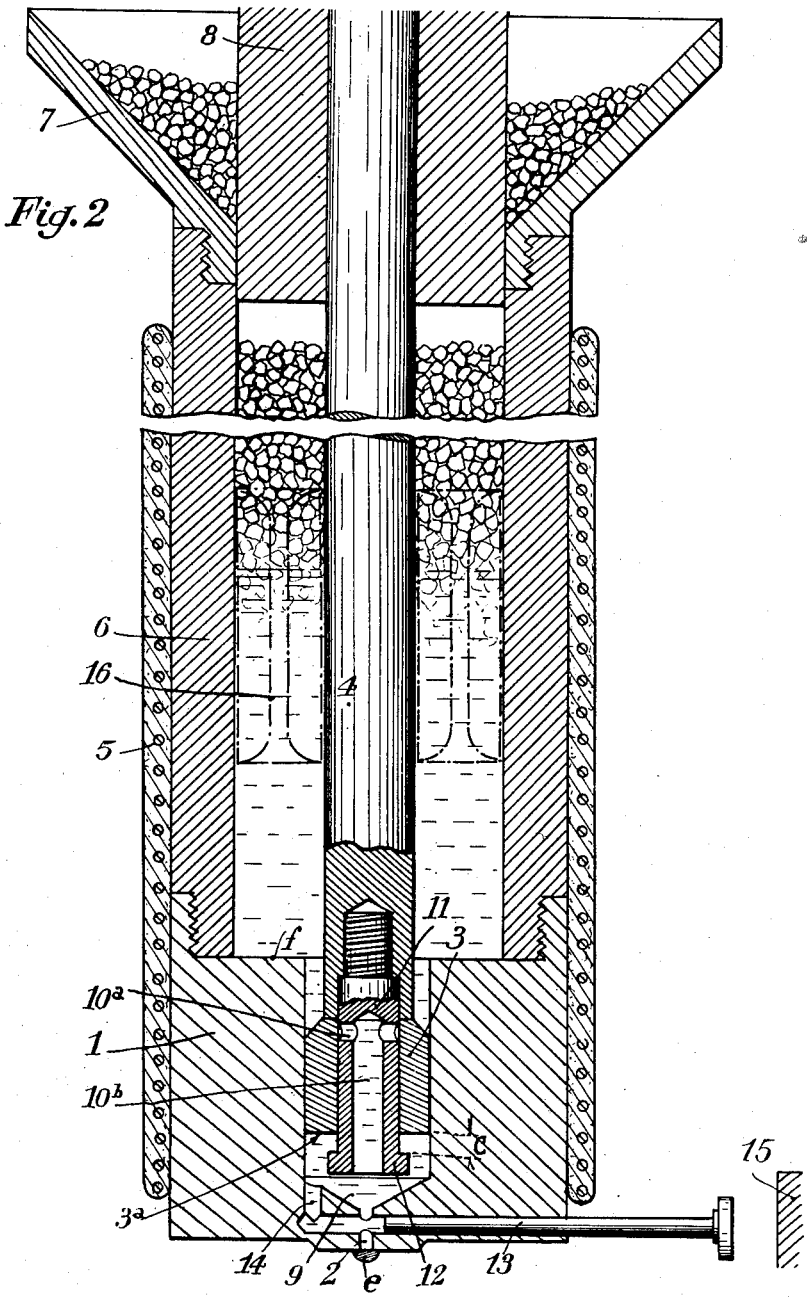

With reference to Fig. 1:

The arrangement comprises an injection chamber 1 in the base of which is pierced an injection orifice 2. In the chamber 1 moves an injection piston 3, operated by a rod 4. One or a number of electrical resistances 5 are provided for heating the chamber 1 as well as a pit 6 which is mounted above it and which is supplied with plastic material from a hopper 7 surrounding the upper opening of the pit. The material contained in the hopper 7 is introduced into the pit 6 by a piston 8 which is completely independent of the piston 3. The sole function of this piston 8 is to push the plastic material towards the bottom of the pit 6 and to prevent the formation of arches of material in the zone at which the latter, sliding down into the pit 6, reaches a certain temperature and adheres, by reason of its semi-molten state, to the heated wall of the pit. The resistances 5 are suitably controlled in order that the raw material contained in the bottom of the pit 6 shall be in a molten condition.

The cylinder 9 of the chamber 1, in which the injection piston 3 moves, may communicate with the pit 6 by means of orifices 10a and a channel 10b, formed in an end-cap 11 which terminates the rod 4. On this end-cap, the piston 3 has a certain liberty of axial displacement between the head 12 of the end-cap and the extremity of the rod 4.

At the base of the cylinder 9, the injection orifice 2 may be closed by means of a shut-off rod 13 which moves in a circular passage of small diameter communicating with the chamber 9 through a channel 14.

From the foregoing description, it will be seen that, in accordance with one of the essential features of the invention, the injection piston 3 is submerged in the molten plastic material so that the operative face 3a of this piston plunges only in this molten material.

The operation of the arrangement is as follows:

In Fig. 1, the piston 3 is at its uppermost position, ready to travel downwards to carry out the injection. During its downward travel, the extremity of the rod 4 comes up against the upper face of the piston 3 and thus shuts off the orifices 10a. As the rod 4 continues downwards, the plastic material contained in the cylinder 9 is compressed and is forced out through the channel 14, the shut-off rod 13 thus moving clear of the orifice 2. The plastic material is then injected through that orifice in accordance with the speed and the pressure impressed on the rod 4 and, in consequence, on the piston 3.

At the end of the injection (Fig. 2), a measured quantity of material has been injected into the mould (not shown), dependent on the travel given to the rod 4. If, at this moment, the mould is taken away from the orifice 2, there will be formed, at the extremity of this latter, a drop e which is more or less large, as is the case with the usual kinds of chamber. When the rod 4 begins to rise again (Fig. 3), the piston 3 remains stationary until the head 12 of the end-cap 11 abuts against it, that is to say after a length of travel c. The piston 3 then rises, thereby creating a reduction of pressure in the cylinder 9 which results at the same time in the sucking-in of the drop e and also a suction of the shut-off rod 13 through the channel 14 (Fig. 3), which is thus automatically closed without having any need for a restoring spring.

As the upward travel of the piston 3 continues (Fig. 3), the reduction of pressure in the cylinder 9 draws in a fresh charge of molten plastic material to the pit 6 through the orifices 10a, 10b.

It is to be noted that the suction is more effective on the shutter rod 13 and the drop e than on the molten material contained in the lower portion of the pit 6, by virtue of a suitable choice of relationship between the surfaces of the orifices 10a and the lower face of the piston 3, this latter being much greater than that corresponding to the said orifices.

At the end of its upward travel, the cylinder 9, supplied through the orifices 10a and the channel 10b is again filled up and the operation of injection may be started again.

The piston 8, which is independent of the injection piston 3 and of the rod 4 has only the function of supplying the pit 6 with raw material and to cause the plastic material contained in the hopper 7 to progress downwards towards the base of the pit 6; the relatively slight pressure which it applies to the said material is clearly independent of the pressure of the injection piston 3; its movement is also independent of that of the latter and it is, for example, possible to carry out several injections whilst the piston 8 has only carried out one single to and fro movement.

In the operation of the whole arrangement, the control of the shutter rod 13 is specially to be emphasized. In working, the opening of this shutter is effected solely by the pressure of the piston 3 on the material contained in the cylinder 9. An abutment 15 is provided to prevent the shutter from sliding out of its housing. As will be evident from the foregoing any resistance to movement of the valve rod 13, will delay the outward movement of rod 13 causing an increase in the pressure in cylinder 9 before the material is released from orifice 2 and thus will result in faster injection of the material into a mould. In the case where one will wish to increase the rapidity of injection it will be possible to hold the rod 13 mechanically locked for a brief instant in the position shown in Figure 1 so that piston 3 will produce a higher compression pressure in cylinder 9.

In the case in which the raw material is very pasty and does not flow sufficiently well through the orifices 10a by suction, the upward course of the piston may be regulated in such manner that its lower face rises above the base f of the pit 6, thus increasing the supply of material, without modifying the other movements referred to above.

If necessary, there may be submerged in the plastic material, between the rod 4 and the internal wall of the pit 6 (Fig. 2) a device 16, which is known as a "torpedo," and which consists of a metallic mass having good heat conducting properties and which is provided with narrow passages for the plastic material, whereby the latter is brought up to the melting temperature in a uniform manner.

From the preceding description, it will readily be understood that the method and the arrangement in accordance with the invention possess the following advantages with respect to those previously known:

(1) A very exact quantity of material injected: the quantity of material injected corresponds, in fact, to the capacity of the mould and is equal in volume to that produced by the displacement of the piston 3, which permits of the use of mechanical pressure on this piston without it being necessary to provide any spring or hydraulic arrangement; the travel of injection is determined by the quantity of material to be injected and its length is regulated in consequence;

(2) A very high speed of injection into the mould by reason of the speed and the constant pressure at the point of discharge of the material from the injection chamber; this rapidity prevents any tendency of the material to thicken when it enters the cold mould and makes possible the production of automatic machines with a number of separate moulds which can be very rapidly supplied from the same injection chamber;

(3) It is possible to obtain very thin small articles which may be of the order of $2/10$ of a millimeter in thickness and less than one gramme in weight;

(4) An injection pressure which is very much lower than that employed by older processes;

(5) The closing-up of the moulds is greatly facilitated by the low pressures required and by the exact quantity of material injected, whilst with the usual kinds of injection chamber, the quantity of material in excess trends to open the filled moulds at the moment when the injection pressure reaches its maximum;

(6) The drops of material at the nozzle of the injection chamber are eliminated;

(7) The temperatures employed are considerably lower than those usually required, with the result that the risk of burning of the material is eliminated; in addition, it has been found in practice that stoving is now superfluous;

(8) In consequence of the low pressures and other advantages given above, it is possible to produce economically with moulds having thin walls.

The articles obtained by the application of the method in accordance with the invention have an improved appearance; their flexibility is also improved when flexible plastic material of the polyethylene and polyamide types are used and the articles are less fragile.

What I claim is:

1. In an injection molding apparatus having an injection chamber adapted to contain liquid material, an output valve leading from said chamber and comprising a piston fitted in a cylinder bore transverse to an exit passageway connected between the inpection chamber and an output orifice, and means forming a liquid passageway to said cylinder bore and so arranged that increased fluid pressure in the injection chamber will displace the piston outwardly uncovering said exit passageway and permit the discharge of material from said injection chamber, and a decrease in pressure in said chamber will cause said piston to close said exit passageway and will suck back into said output orifice any drop of liquid hanging therefrom.

2. In an injection molding apparatus having an injection chamber adapted to contain liquid material, an outlet orifice leading from said chamber, an outlet valve controlling said orifice comprising a piston slidable in a cylinder transverse to said outlet orifice, a passage leading from said chamber to said cylinder whereby the liquid pressure within said injection chamber acts on the head of said piston.

3. The combination of elements as claimed in claim 2 in which said piston slidable in a cylinder transverse to said outlet valve is perpendicular to the path of material flowing from said injection chamber.

4. The combination of elements as claimed in claim 2 in which said passage leading from said chamber is an L-shaped passage.

5. An apparatus of the type described comprising a reservoir of material to be injection moulded, an injection chamber, an output valve in said injection chamber actuated open by increased pressure within said chamber and actuated closed by decreased pressure within said chamber, a piston extending into said injection chamber, an input valve opening in the side of said piston connecting the reservoir and injection chamber, a shoulder portion on said piston shortly above said valve opening, a coaxial sleeve surrounding said piston and in tight-fitting but slidable relation with said piston and the walls of the injection chamber, said sleeve being slidable on the injection stroke of said piston to a position tightly abutting the shoulder on said piston and covering the input valve opening, whereby on the injection stroke of said piston said input valve is covered by the coaxial sleeve and a tight seal achieved between said sleeve, said shoulder and the portion of the piston between said shoulder and the input valve opening, and whereby on a reverse stroke of said piston a negative pressure is created in said injection chamber by said sleeve sliding relative to said piston before uncovering said input valve opening and any drop of liquid will be sucked into said chamber from said output valve before the latter closes.

6. An apparatus of the type described and as defined in claim 5 wherein the output valve in the injection chamber is a transverse sliding piston.

7. High speed injection moulding apparatus comprising a reservoir of material to be injection moulded, an injection chamber, an output valve in said injection chamber actuated open by increased pressure within said chamber and actuated closed by decreased pressure within said chamber, a piston movable at high speed into said injection chamber to force under high pressure a precisely measured amount of said material from said chamber out through said output valve, an input valve having a passageway connecting said reservoir and said chamber and having an opening parallel with said piston, a sleeve axially movable with said piston and in tight-fitting but slidable relation therewith, said sleeve having an axial lost-motion connection with said piston and being movable with said piston on an injection stroke axially forward across said opening to give a tight seal against material passing back through said opening and being axially movable in reverse after lost-motion between itself and said piston to uncover said opening and refill said chamber only after a suction pressure has been produced at said output valve whereby any drop of material at said output valve will be sucked into said chamber before said output valve closes and said input valve opens.

References Cited in the file of this patent

UNITED STATES PATENTS

| | | |
|---|---|---|
| 777,870 | Vellino | Dec. 20, 1904 |
| 856,026 | Brown et al. | June 4, 1907 |
| 2,016,503 | Kenworthy | Oct. 8, 1935 |
| 2,422,990 | Spanier | June 24, 1947 |
| 2,491,343 | Valyi | Dec. 13, 1949 |
| 2,585,112 | Gravesen | Feb. 12, 1952 |
| 2,621,365 | Deschamps | Dec. 16, 1952 |
| 2,688,986 | Miles | Feb. 16, 1954 |

FOREIGN PATENTS

| | | |
|---|---|---|
| 1,047,420 | France | July 22, 1953 |

UNITED STATES PATENT OFFICE
CERTIFICATE OF CORRECTION

Patent No. 2,872,705            February 10, 1959

Maurice Labarre

It is hereby certified that error appears in the printed specification of the above numbered patent requiring correction and that the said Letters Patent should read as corrected below.

Column 4, line 14, for "trends" read -- tends --; line 36, for "inpection" read -- injection --.

Signed and sealed this 26th day of May 1959.

(SEAL)
Attest:

ARL H. AXLINE
Attesting Officer

ROBERT C. WATSON
Commissioner of Patents